No. 787,928. PATENTED APR. 25, 1905.
H. LIEBER.
RADIO-ACTIVE MATTER AND PROCESS OF MAKING SAME.
APPLICATION FILED MAR. 12, 1904.
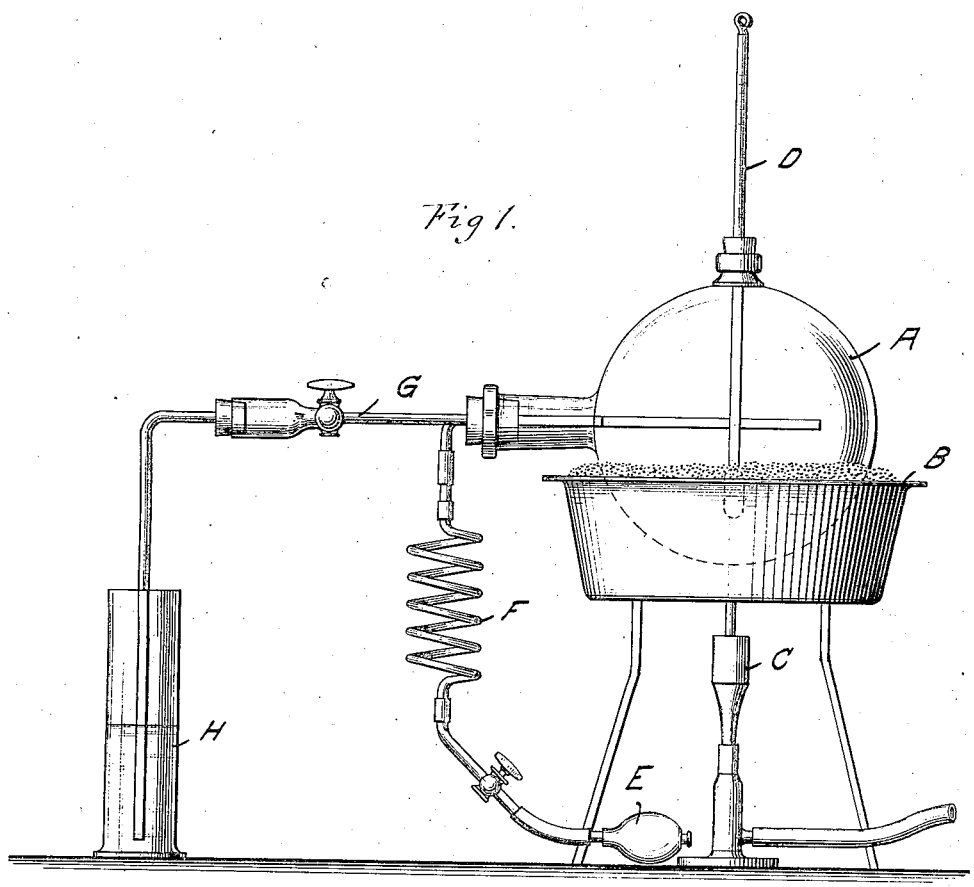
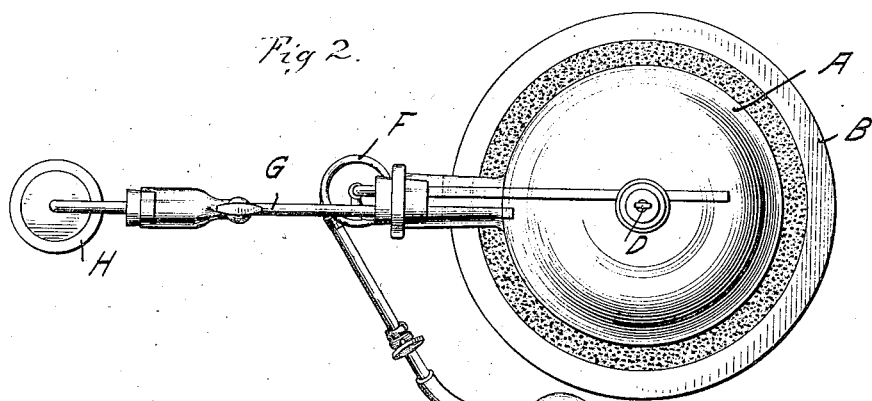
Witnesses
F. N. Roehrich
Lillian Mullins
Inventor
Hugo Lieber
By his Attorney Louis Hicks No. 787,928. Patented April 25, 1905.

UNITED STATES PATENT OFFICE.

HUGO LIEBER, OF NEW YORK, N. Y.

RADIO-ACTIVE MATTER AND PROCESS OF MAKING SAME.

SPECIFICATION forming part of Letters Patent No. 787,928, dated April 25, 1905.

Application filed March 12, 1904. Serial No. 197,838.

*To all whom it may concern:*

Be it known that I, HUGO LIEBER, a citizen of the United States, residing in the city, county, and State of New York, have invented a certain new and useful Improvement in Radio-Active Matter Impregnated with Thorium Emanations and Process of Making Same, of which the following is a specification.

This invention relates to emanations from a radio-active substance—thorium—and has for its object a process or method of impregnating matter having cohesive particles with thorium emanations, thereby rendering the matter radio-active, and the production by means of the process of a new article of manufacture—to wit, radio-active matter having cohesive particles impregnated with thorium emanations, as hereinafter more particularly described. Solids and fluids constitute "matter having cohesive particles," and by the expression "matter having cohesive particles" I intend to include solids and liquids, but not gases, the particles of which have no cohesion.

My invention is illustrated in the drawings forming part of this specification.

Figure 1 is a view in elevation of apparatus suitable for carrying out the process of my invention. Fig. 2 is a view from above of the apparatus shown in Fig. 1.

In the drawings, A is a glass vessel containing thorium oxid and resting in a bath of sand B.

C is a Bunsen burner by means of which heat may be applied to the bath of sand B, and thereby to the thorium oxid contained in the glass vessel A, in order to facilitate the emanating or the giving off by the thorium of the thorium emanations.

D is a thermometer which indicates the temperature to which the thorium oxid is heated.

E is a bulb used for blowing a current of air through the tube F into the glass vessel A, thereby causing the thorium emanations to pass out of the glass vessel A and through the tube G into the vessel H. The vessel H is a vessel into which is put the water or other liquid or substance to be impregnated with the thorium emanations, and thereby to be rendered radio-active. The thorium emanations being blown with a current of air from the glass vessel A through the tube G into the water, liquid, or other substance contained in the vessel H come into intimate contact with the water, liquid, or other substance and impregnate it.

Thorium is a radio-active substance, and it emits and radiates rays called "Becquerel" rays. In addition to the emission of Becquerel rays thorium gives off emanations of gaseous particles. These thorium emanations of gaseous particles are characterized and defined, first, by their radio-activity evidenced by their power to discharge an electroscope and by other phenomena of radio-activity; second, by their capability of being transferred, as when blown by a current of air, from one vessel into another, where they produce the same effects as they previously produced in the first vessel; third, by their capability of being reduced at a low temperature, like other gases, to a liquid, too small in quantity, however, to admit of measurement, and, fourth, by various other phenomena. The radio-activity of the thorium emanations is capable of measurement. The thorium emanations possess the quality of ionizing the air or other gas, rendering it a conductor of electricity. If the gaseous particles constituting the thorium emanations are left in a closed vessel, a radio-active substance is soon deposited upon the inner surface of the vessel, being shown by its radio-activity. As electricity is definitely known by its qualities and effects, so the thorium emanations are definitely characterized and defined by their qualities and effects produced by their presence.

The emanations from thorium can be utilized to render other substances radio-active. Other substances rendered radio-active by means of thorium emanations may be said to be secondarily radio-active. I have discovered that other substances can be impregnated with thorium emanations, according to the process of my invention and can thereby be rendered persistently radio-active or radio-active in such degree that they retain their radio-activity for a considerable length of time.

A satisfactory manner of obtaining the emanations from thorium and of utilizing them in carrying out my invention is by heating thorium oxid below red heat and then by means of an air-current or similar device blowing the emanations into the matter to be impregnated and made radio-active or otherwise bringing the thorium emanations into intimate contact therewith. Heat is preferably applied in order to facilitate the giving off of the thorium emanations; but thorium gives off the emanations without heat. Instead of thorium oxid there can be used in like manner for the obtaining of emanations other forms of thorium—for example, thorium nitrate—preferably in solution with water. Should thorium nitrate be used, the use for which the impregnated radio-active substance may be intended may require the neutralization of any free nitric acid present.

The emanations blown into the matter to be impregnated and made radio-active or otherwise brought into intimate contact therewith combine with the particles of the cohesive matter throughout its mass. The method of blowing the emanations into the matter is given merely as one satisfactory manner of carrying out the principle of my invention, which consists in impregnating the matter to be made radio-active with thorium emanations, or, in other words, in combining the thorium emanations with the particles of the matter to be made radio-active throughout the mass of the matter. In the case of solids it may be necessary to heat the solid to a liquid form and to blow the emanations into the matter while in the liquid form, or if the solid substance is in a comminuted condition the thorium emanations may be brought into contact and combined with the particles of the solid substance throughout its mass by blowing the thorium emanations into and throughout the particles of the solid substance. Other methods can be employed; but whatever may be the particular manner adopted to carry out the principle of my invention the essential feature is that the thorium emanations shall be brought into intimate contact with the matter to be rendered radio-active and shall impregnate the matter, or, in other words, shall combine with the particles of the matter throughout the mass of the matter. The thorium emanations being blown into or otherwise brought into intimate contact with the water, liquid, or other substance to be impregnated the water, liquid, or other substance is thereby impregnated with the thorium emanations and rendered persistently radio-active—that is, radio-active to such an extent and degree that the radio-activity will be retained for a considerable length of time and will enable the radio-active water, liquid, or other substance to be used for many purposes. Substances rendered secondarily radio-active through impregnation by thorium emanations according to my invention are beneficial and useful—for example, in the treatment of disease and in the preservation of food.

Water and other liquids, salve, and paste thus made radio-active can readily be applied in the treatment of disease and for other purposes. Food products—such as canned foods, meat, beef extracts, and other prepared foods, milk, cheese, and cream compounds, preserves, and the like, thus made radio-active—are preserved, and other decomposible matter thus made radio-active is preserved from decomposition and decay. I do not, however, claim specifically in this application radio-active salves and pastes impregnated with thorium emanations, since such salves and pastes are claimed in a separate application filed by me on the 17th day of June, 1904, Serial No. 213,046; neither do I claim specifically in this application preserved organic matter or preserved organic food, since such preserved organic matter and preserved organic food are claimed in another application, filed by me on the 17th day of June, 1904, Serial No. 213,047.

I am aware that the thorium salts have been dissolved in water previous to my invention, and such is not my invention. When a salt of thorium is dissolved in water or other liquid, the thorium salt permeates the water or other liquid in which it is dissolved. When, however, according to my invention as above described thorium emanations are given off, the thorium emanations are separate and free from the thorium from which they were obtained, and when the thorium emanations so obtained are brought into intimate contact with the matter to be rendered radio-active and impregnate the matter, combining with the particles of the matter throughout the mass of the matter, the matter so impregnated is free from the thorium from which the thorium emanations were obtained and is radio-active by reason of the emanations or gaseous particles separated from the thorium by which they were given off and combined with the particles of the matter throughout its mass.

What I claim is—

1. Radio-active matter, consisting of matter having cohesive particles and thorium emanations in combination with the particles of the matter throughout its mass, the matter being free from the thorium from which emanations were obtained and radio-active by reason of the thorium emanations in combination with the particles of the matter throughout its mass, substantially as described.

2. Radio-active liquid, consisting of a liquid and thorium emanations in combination with the particles of the liquid throughout its mass, the liquid being free from the thorium from which emanations were obtained and radio-active by reason of the thorium emanations in combination with the particles of the liquid throughout its mass, substantially as described.

3. Radio-active water, consisting of water and thorium emanations in combination with the particles of the water throughout its mass, the water being free from the thorium from which emanations were obtained and radio-active by reason of the thorium emanations in combination with the particles of the water throughout its mass, substantially as described.

4. The method of rendering matter having cohesive particles radio-active, consisting in heating thorium below red heat, then separating the thorium emanations from the thorium, and then impregnating the matter with the thorium emanations by combining the thorium emanations free from the thorium from which they were obtained with the particles of the matter throughout its mass, substantially as described.

5. The method of rendering matter having cohesive particles radio-active, consisting in heating thorium below red heat and then embodying the thorium emanations within the matter by blowing the thorium emanations into the matter, substantially as described.

6. The method of rendering matter having cohesive particles persistently radio-active, consisting in combining thorium emanations free from the thorium from which they were obtained with the particles of the matter throughout its mass, substantially as described.

7. The method of rendering matter having cohesive particles radio-active consisting in embodying thorium emanations within the matter by blowing thorium emanations into the matter, substantially as described.

In testimony whereof I have signed my name to this specification in the presence of two subscribing witnesses.

HUGO LIEBER.

Witnesses:
FRANK E. CASH,
A. J. STRACHAN.